(12) United States Patent
Li

(10) Patent No.: US 12,361,690 B2
(45) Date of Patent: Jul. 15, 2025

(54) RANDOM SAMPLING CONSENSUS FEDERATED SEMI-SUPERVISED LEARNING

(71) Applicant: The Hong Kong University of Science and Technology, Hong Kong (CN)

(72) Inventor: Xiaomeng Li, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 388 days.

(21) Appl. No.: 17/931,731

(22) Filed: Sep. 13, 2022

(65) Prior Publication Data

US 2023/0177812 A1    Jun. 8, 2023

Related U.S. Application Data

(60) Provisional application No. 63/287,093, filed on Dec. 8, 2021.

(51) Int. Cl.
*G06V 10/774* (2022.01)
*G06N 20/00* (2019.01)
*G06V 10/94* (2022.01)

(52) U.S. Cl.
CPC ......... *G06V 10/7753* (2022.01); *G06N 20/00* (2019.01); *G06V 10/95* (2022.01)

(58) Field of Classification Search
CPC .... G06V 10/7753; G06V 10/95; G06N 20/00; G06N 3/0464; G06N 3/088; G06N 3/0895; G06N 3/09; G06N 3/096; G06N 3/098; G06N 3/08
See application file for complete search history.

(56) References Cited

U.S. PATENT DOCUMENTS

| | | | |
|---|---|---|---|
| 2018/0336486 A1* | 11/2018 | Chu | G06N 20/00 |
| 2020/0394552 A1* | 12/2020 | Ganapavarapu | H04L 9/3239 |
| 2021/0073677 A1* | 3/2021 | Peterson | G06N 20/00 |

(Continued)

FOREIGN PATENT DOCUMENTS

CN    113691594    * 11/2021

OTHER PUBLICATIONS

Liang, Xiaoxiao, et al. "Rscfed: Random sampling consensus federated semi-supervised learning." Proceedings of the IEEE/CVF conference on computer vision and pattern recognition. 2022. (Year: 2022).*

(Continued)

*Primary Examiner* — Andrae S Allison
(74) *Attorney, Agent, or Firm* — Saliwanchik, Lloyd & Eisenschenk

(57) ABSTRACT

A method and systems for random sampling consensus federated (RSCFed) learning in non-IID settings are provided. The method includes randomly sampling local clients, assigning a current global model to the randomly sampled local clients for initialization at beginning of a synchronization round, conducting local training on the randomly sampled local clients, collecting local models from the randomly sampled local clients and executing distance-reweighted model aggregation (DMA) on the collected local models to obtain a sub-consensus model, repeating above steps multiple times to obtain a set of sub-consensus models, and aggregating a new model based on the sub-consensus models to be next global model.

20 Claims, 4 Drawing Sheets

(56) References Cited

U.S. PATENT DOCUMENTS

| | | | |
|---|---|---|---|
| 2021/0150269 A1* | 5/2021 | Choudhury | G06V 30/1985 |
| 2021/0312336 A1* | 10/2021 | Sinn | G06N 3/084 |
| 2022/0012637 A1* | 1/2022 | Rezazadegan Tavakoli | G06N 3/088 |
| 2022/0058507 A1* | 2/2022 | El-Khamy | G06N 3/045 |
| 2022/0129706 A1* | 4/2022 | Vivona | G06N 3/045 |
| 2024/0070530 A1* | 2/2024 | Amid | G06N 20/00 |
| 2024/0086718 A1* | 3/2024 | Malaviya | G06N 3/0895 |

OTHER PUBLICATIONS

Lin, Haowen, et al. "Semifed: Semi-supervised federated learning with consistency and pseudo-labeling." arXiv preprint arXiv: 2108.09412 (2021). (Year: 2021).*

Yang, Dong, et al. "Federated semi-supervised learning for COVID region segmentation in chest CT using multi-national data from China, Italy, Japan." Medical image analysis 70 (2021): 101992. (Year: 2021).*

Hegedüs, István, Gábor Danner, and Márk Jelasity. "Decentralized learning works: An empirical comparison of gossip learning and federated learning." Journal of Parallel and Distributed Computing 148 (2021): 109-124. (Year: 2021).*

Berthelot, D., et al., "MixMatch: A Holistic Approach to Semi-Supervised Learning," arXiv preprint, arXiv:1905.02249v2 [cs.LG], Oct. 23, 2019, pp. 1-14.

Chen, H.-Y., et al., "Fedbe: Making Bayesian Model Ensemble Applicable to Federated Learning," arXiv preprint, arXiv:2009.01974v4 [cs.LG], Oct. 10, 2021, pp. 1-21.

Chen, X., et al., "Semi-Supervised Semantic Segmentation with Cross Pseudo Supervision," arXiv preprint, arXiv:2106.01226v2 [cs.CV], Jun. 4, 2021, pp. 1-10.

Cui, W., et al., "Semi-Supervised Brain Lesion Segmentation with an Adapted Mean Teacher Model," arXiv preprint, arXiv:1903.01248v1 [cs.CV], Mar. 4, 2019, pp. 1-12.

Fischler, M. A., et al., "Random Sample Consensus: A Paradigm for Model Fitting with Applications to Image Analysis and Automated Cartography," Communications of the ACM, Jun. 1981, 24(6):381-395.

He, K., et al., "Deep Residual Learning for Image Recognition," arXiv preprint, arXiv:1512.03385v1 [cs.CV], Dec. 10, 2015, pp. 1-12.

Hu, Z., et al., "SimPLE: Similar Pseudo Label Exploitation for Semi-Supervised Classification," arXiv preprint, arXiv:2103.16725v2 [cs.CV], Jun. 29, 2022, pp. 1-13.

Jeong, W., et al., "Federated Semi-Supervised Learning With Inter-Client Consistency & Disjoint Learning," arXiv preprint, arXiv:2006.12097v3 [cs.LG], Mar. 29, 2021 pp. 1-15.

Kairouz, P., et al., "Advances and Open Problems in Federated Learning," arXiv preprint, arXiv: 1912.04977v3 [cs.LG], Mar. 9, 2021, pp. 1-121.

Kaissis, G.A., et al., "Secure, privacy-preserving and federated machine learning in medical imaging," Nature Machine Intelligence, Jun. 2020, 2:305-311.

Kang, Y., et al., "FedCVT: Semi-Supervised Vertical Federated Learning with Cross-View Training," J. ACM, Jan. 2022, 1(1):1-17.

Karimireddy, S.P., et al., "SCAFFOLD: Stochastic Controlled Averaging for Federated Learning," arXiv preprint, arXiv:1910.06378v4 [cs.LG], Apr. 9, 2021, pp. 1-41.

Konecny, J., et al., "Federated Learning: Strategies for Improving Communication Efficiency," arXiv preprint, arXiv:1610.05492v2 [cs.LG], Oct. 30, 2017, pp. 1-10.

Kumar, R., et al., "Blockchain-Federated-Learning and Deep Learning Models for COVID-19 detection using CT Imaging," arXiv preprint, arXiv:2007.06537v2 [eess.IV], Dec. 8, 2020, pp. 1-16.

Li, Q., et al., "Federated Learning on Non-IID Data Silos: An Experimental Study," arXiv preprint, arXiv:2102.02079v4 [cs.LG], Oct. 28, 2021, pp. 1-20.

Li, T., et al., "Federated Optimization in Heterogeneous Networks," arXiv preprint, arXiv:1812.06127v5 [cs.LG], Apr. 21, 2020, pp. 1-22.

Li, X., et al., "Transformation-consistent Self-ensembling Model for Semi-supervised Medical Image Segmentation," arXiv preprint, arXiv:1903.00348v3 [cs.CV], May 8, 2020, pp. 1-12.

Lin, H., et al., "SemiFed: Semi-supervised Federated Learning with Consistency and Pseudo-Labeling," arXiv preprint, arXiv:2108.09412v1 [cs.LG], Aug. 21, 2021, pp. 1-10.

Liu, Q., et al., "FedDG: Federated Domain Generalization on Medical Image Segmentation via Episodic Learning in Continuous Frequency Space," arXiv preprint, arXiv:2103.06030v1 [cs.CV], Mar. 10, 2021, pp. 1-9.

Liu, Q., et al., "Federated Semi-supervised Medical Image Classification via Inter-client Relation Matching," arXiv preprint, arXiv:2106.08600v1 [cs.CV], Jun. 16, 2021, pp. 1-11.

Liu, Y., et al., "FedVision: An Online Visual Object Detection Platform Powered by Federated Learning," arXiv preprint, arXiv:2001.06202v1 [cs.LG], Jan. 17, 2020 pp. 1-8.

McMahan, H.B., et al., "Communication-Efficient Learning of Deep Networks from Decentralized Data," arXiv preprint, arXiv:1602.05629v4 [cs.LG], Jan. 26, 2023, pp. 1-11.

Sohn, K., et al., "FixMatch: Simplifying Semi-Supervised Learning with Consistency and Confidence," 34th Conference on Neural Information Processing Systems, 2020, pp. 1-21.

Tarvainen, A., et al., "Mean teachers are better role models: Weight-averaged consistency targets improve semi-supervised deep learning results," arXiv preprint, arXiv:1703.01780v6 [cs.NE], Apr. 16, 2018, pp. 1-16.

Wang, H., et al., "Federated learning with matched averaging," arXiv preprint, arXiv:2002.06440v1 [cs.LG], Feb. 15, 2020, pp. 1-16.

Wang, J., et al., "Tackling the Objective Inconsistency Problem in Heterogeneous Federated Optimization," arXiv preprint, arXiv:2007.07481v1 [cs.LG], Jul. 15, 2020, pp. 1-34.

Yang, D., et al., "Federated Semi-Supervised Learning for COVID Region Segmentation in Chest CT using Multi-National Data from China, Italy, Japan," Medical Image Analysis, 2020, pp. 1-19.

Yang, Q., et al., "Federated Machine Learning: Concept and Applications," ACM Trans. Intell. Syst. Technol., Feb. 2019, 10(2):1-19.

Yin, H., et al., "See through Gradients: Image Batch Recovery via GradInversion," arXiv preprint, arXiv:2104.07586v1 [cs.LG], Apr. 15, 2021, pp. 1-13.

Yoon, T., et al., "Fedmix: Approximation of Mixup Under Mean Augmented Federated Learning," arXiv preprint, arXiv:2107.00233v1 [cs.LG], Jul. 1, 2021, pp. 1-19.

Yu, L., et al., "Uncertainty-aware Self-ensembling Model for Semi-supervised 3D Left Atrium Segmentation," arXiv preprint, arXiv:1907.07034v1 [cs.CV], Jul. 16, 2019, pp. 1-9.

Yurochkin, M., et al., "Bayesian Nonparametric Federated Learning of Neural Networks," arXiv preprint, arXiv:1905.12022v1 [stat.ML], May 28, 2019, pp. 1-15.

Zhang, M., et al., "Personalized Federated Learning With First Order Model Optimization," arXiv preprint, arXiv:2012.08565v4 [cs.LG], Mar. 26, 2021, pp. 1-17.

Zhang, Z., et al., "Benchmarking Semi-Supervised Federated Learning," arXiv preprint, arXiv:2008.11364v1 [cs.LG], Aug. 26, 2020, pp. 1-19.

Zou, Y., et al., "Pseudoseg: Designing Pseudo Labels for Semantic Segmentation," ICLR 2021, 2021, pp. 1-18.

* cited by examiner

RANDOM SAMPLING CONSENSUS FEDERATED SEMI-SUPERVISED LEARNING

CROSS-REFERENCE TO RELATED APPLICATION

This application claims the benefit of U.S. Provisional Application Ser. No. 63/287,093, filed Dec. 8, 2021, which is hereby incorporated by reference in its entirety including any tables, figures, or drawings.

BACKGROUND OF THE INVENTION

The core idea of federated learning (FL) is to train machine learning models on separate datasets that are distributed across different locations or devices, preserving the local data privacy to a certain extent. Over the past few years, FL has emerged as an important research tool and attracted attentions for studying applications of FL to areas such as medical image diagnosis [10, 14, 28], image classification and object detection [22]. Various FL methodologies such as FedAvg [23], SCAFFOLD and MOON have been proposed and the preliminary results obtained are quite promising. However, applications of these methodologies in real practice are still limited due to the requirement of fully labeled images on each local client.

Recently, federated semi-supervised learning (FSSL) [8, 19, 21, 28] aiming to utilize unlabeled images to enhance global model development of FL has become a new research arena. One line of FSSL focused on each client having partially labeled and unlabeled images. For example, Jeong et al. [8] introduced the concept of inter-client consistency loss to improve the global model by encouraging consistent outputs from multiple clients. Another line of FSSL [21, 28] made the assumption that some local clients had fully labeled images and were denoted as labeled clients, while other local clients had unlabeled images and were denoted as unlabeled clients. Nevertheless, these methods are limited in two aspects. First, they do not take into account the not independent and identically distributed (Non-IID) data among local clients, resulting in deterioration of performance accuracy of [9, 15]. Second, some of the methods share the correlation matrix among local clients, making information leakage possible.

One potential solution of the issues was by extending applications of the existing FSSL methods, for instance, FedIRM and Fed-Consist [28], to the Non-IID settings. However, the approach failed to generalize the methods to the Non-IID settings. The FedIRM method shared an inter-class correlation matrix among clients, which could not be correctly learned due to the heterogeneous data among local clients, thereby hurting the model performance. The Fed-Consist method equally averaged the model weights from the labeled and unlabeled clients. However, when the number of the unlabeled clients was increased, the model performance significantly decreased as the global model might be dominated by the unlabeled clients. Another potential solution was by adjusting aggregation weights for the labeled and unlabeled clients in which the weights for the labeled clients are increased while the weights for the unlabeled ones were decreased. Nevertheless, the preliminary results only demonstrated limited performance improvement.

BRIEF SUMMARY OF THE INVENTION

There continues to be a need in the art for improved designs and techniques for a method and systems for performing random sampling consensus federated (RSCFed) learning in non-IID settings.

According to an embodiment of the subject invention, a method of random sampling consensus federated (RSCFed) learning is provided. The method comprises randomly sampling local clients; assigning a current global model to the randomly sampled local clients for initialization at beginning of a synchronization round; conducting local training on the randomly sampled local clients; collecting local models from the randomly sampled local clients and executing distance-reweighted model aggregation (DMA) on the collected local models to obtain a sub-consensus model; repeating above steps multiple times to obtain a set of sub-consensus models; and aggregating a new model based on the sub-consensus models to be next global model. The local clients comprise labeled local clients having labeled local data and unlabeled local clients having unlabeled local data. Moreover, the assigning a current global model to the randomly sampled clients for initialization comprises initializing the local models with the current global model for performing local training on the randomly sampled clients. The conducting local training comprises conducting standard supervised and unsupervised training on the labeled and unlabeled local clients, respectively. The local training on the labeled local clients is conducted with a main objective, cross-entropy loss, LCE, defined by Equation:

$$L_{CE} = -y_i \log(\hat{y}_i);$$

where $\hat{y}_i$ is a prediction of the randomly sampling local clients from the corresponding local model. The local training on the unlabeled local clients is conducted by a mean-teacher-based consistency regularization framework and regarding a student model as the local model. Further, the distance-reweighted model aggregation (DMA) is configured to dynamically adjust weights of the collected models. During the local training on the unlabeled local clients, after predictions from the student model and the teacher model are generated, a sharpening method is configured to increase a temperature of the predictions of the teacher model. When the local training is completed, the student model is provided as the local model for the corresponding unlabeled local client. In addition, the executing distance-reweighted model aggregation (DMA) comprises computing an intra-subset averaged model for each subset; scaling weight for the local client in each subset; and normalizing the intra-subset model weight into a range of [0, 1].

In certain embodiments of the subject invention, a system for performing random sampling consensus federated (RSCFed) learning is provided. The system comprises a federal server coupled to a plurality of local clients through a communication network and the federal server is configured to randomly sample the plurality of local clients, assign a current global model to the randomly sampled local clients for initialization at beginning of a synchronization round, conduct local training on the randomly sampled local clients; collect local models from the randomly sampled local clients, execute distance-reweighted model aggregation (DMA) on the collected local models to obtain a sub-consensus model, repeat above steps multiple times to obtain a set of sub-consensus models, and aggregate a new model based on the sub-consensus models to be next global model. The local clients comprise labeled local clients having labeled local data and unlabeled local clients having unlabeled local data. Moreover, assigning a current global model to the randomly sampled clients for initialization comprises initializing local models with the current global model for performing local training on the randomly sampled clients. The local training comprises conducting standard supervised and unsupervised training on the labeled and unlabeled local clients, respectively. The local training on the labeled local clients is conducted with a main objective, cross-entropy loss, LCE, defined by Equation:

$$L_{CE} = -y_i \log(\hat{y}_i)$$

where $\hat{y}_i$ is a prediction of the randomly sampled local clients from the corresponding local model. The local training on the unlabeled local clients is conducted by a mean-teacher-based consistency regularization framework and regarding a student model as the local model. Further, the distance-reweighted model aggregation (DMA) is configured to dynamically adjust weights of the collected models. During the local training on the unlabeled local clients, after predictions from the student model and the teacher model are generated, a sharpening method is configured to increase a temperature of the predictions of the teacher model. When the local training is completed, the student model is provided as the local model for the corresponding unlabeled local client. In addition, the distance-reweighted model aggregation (DMA) is performed by computing an intra-subset averaged model for each subset; scaling weight for a local client in each subset; and normalizing the intra-subset model weight into a range of [0, 1].

DETAILED DISCLOSURE OF THE INVENTION

Embodiments of the subject invention pertain to a method and systems for performing Federated semi-supervised learning (FSSL), aiming to derive a global model by jointly training fully labelled and fully unlabelled clients.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
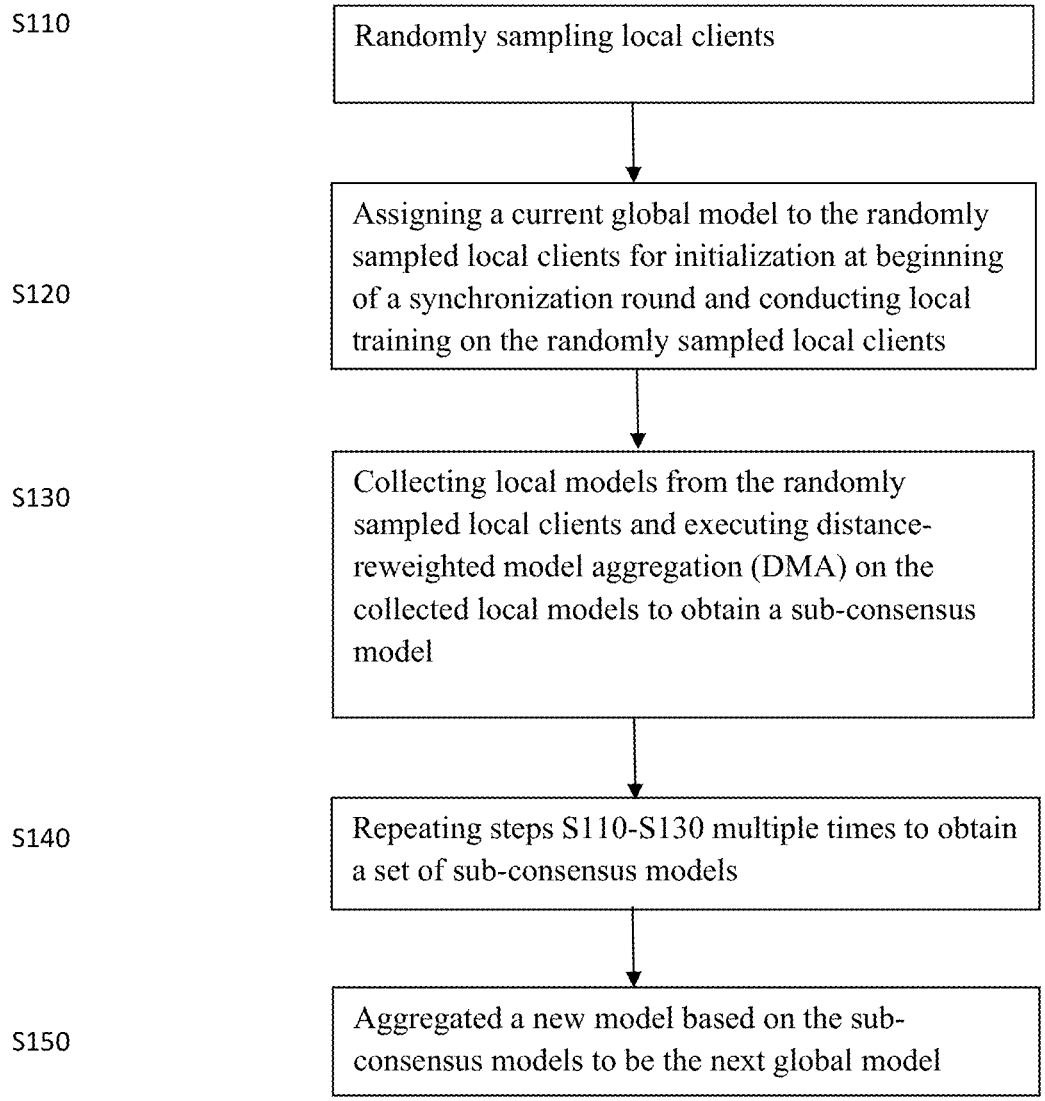
FIG. 1 is a flow chart showing steps of the random sampling consensus federated (RSCFed) learning method, according to an embodiment of the subject invention.
Figure 2:
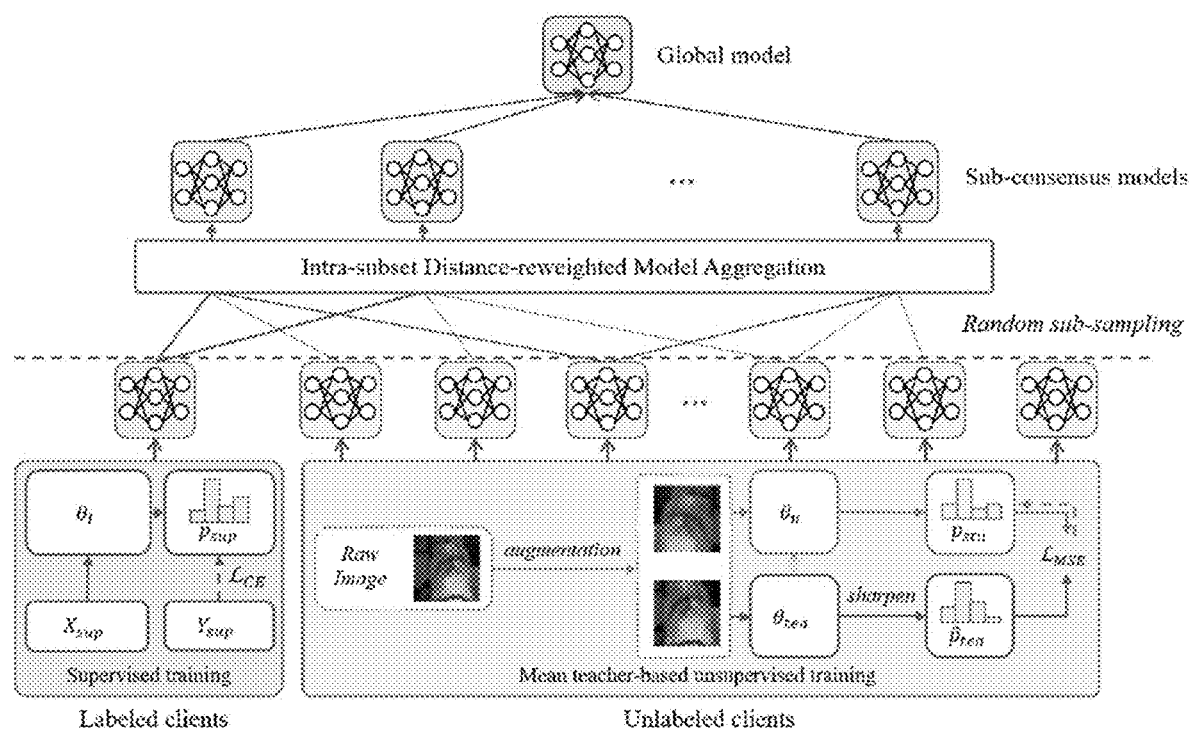
FIG. 2 is a schematic representation of an overview of the RSCFed method, wherein the labeled and unlabeled local clients are optimized by supervised cross-entropy loss $L_{CE}$ and mean-teacher-based consistency loss $L_{MSE}$, respectively, wherein the RSCFed performs multiple random sub-samplings among all clients with distance-reweighted model aggregation (DMA) to increase the weights for the clients that are close to the sub-consensus model and vice versa, inhibiting the influence of a deviated local model imposed upon the global model, according to an embodiment of the subject invention.

Referring to FIGS. 1 and 2, for the labeled and unlabeled local clients, embodiments of the RSCFed method of the subject invention perform following steps in each round. First, at step S110, local clients are randomly sampled. Then, at step S120, a current global model is assigned to the randomly sampled local clients for initialization and local training is conducted on the randomly sampled local clients. Next, at step S130, local models from the randomly sampled local client are collected and distance-reweighted model aggregation (DMA) is executed to obtain a sub-consensus model. Then, at step S140, the steps S110-S130 are repeated multiple times to obtain a set of sub-consensus models. Next, at step S150, a new model is aggregated based on the sub-consensus models to be the next global model.

1.1. FSSL Setting

It is assumed that there are m labeled local clients denoted as $\{C_1, \ldots, C_m\}$, and each of them has a local dataset, $D^l$, defined as $D^l = \{(X_i^l, y_i^l)\}_{i=1}^{N^l}$. Similarly, it is assumed that there are n unlabeled local clients denoted as $\{C_{m+1}, \ldots, C_{m+n}\}$, and each has a local dataset $D^u$ containing $N^u$ unlabeled data $D^u = \{(X_i^u, yy_i^l)\}_{i=1}^{N^u}$. The embodiments of the RSCFed method of the subject invention are configured to derive a global model $\theta_{glob}$ by utilizing both labeled and unlabeled local data in a decentralized scheme in which the separate labeled and unlabeled local datasets are distributed across different locations or devices. The RSCFed method of the embodiments of the subject invention is based on a general federated learning (FL) framework and can be applied to identification of a variety of local data including, but not limited to, images, mobile packets, smart finance data, smart energy data, or traffic sign information of smart cities.

1.2. Local Training

All local models are initialized with the current global model $\theta_{glob}^{t}$ at the beginning of $t^{th}$ synchronization round. The embodiments of the RSCFed method of the subject invention are configured to perform standard supervised and unsupervised training on the labeled and unlabeled local clients, respectively. For illustration purpose, all representations in this section are defaulted to occur in the $t^{th}$ synchronization round.

Labeled Local Clients

For the local training performed on the labeled local clients, cross-entropy loss $L_{CE}$ is adopted as the main objective as defined by Equation (1):

$$L_{CE} = -y_i \log(\hat{y}_i); \quad (1)$$

where $\hat{y}_i$ is the prediction of local data from the local model. The client then returns $\theta_l$ to the server after training.

Unlabeled Local Clients

For the unlabeled clients, mean-teacher-based consistency regularization framework is adopted and student model is regarded as the local model. The teacher model $\theta_{tea}$ is initialized with $\theta_{glob}^{0}$ when this client is selected for the first time. In each local iteration performed on the unlabeled local clients, a batch of input images are augmented twice and separately fed into the student model and the teacher model. After their predictions $p_{stu}$ and $p_{tea}$ are generated, a sharpening method defined in Equation (1) is utilized to increase the temperature of teacher's predictions as shown in Equation (2):

$$\hat{p}_i = \text{Sharpen}(p_{len}, \tau)_i = p_i^{\frac{1}{\tau}} \bigg/ \sum_j p_j^{\frac{1}{\tau}}, \quad (2)$$

where $p_i$ and $\hat{p}_i$ refer to each element in $p_{tea}$ before and after sharpening, respectively, and t is the temperature parameter. Thus, $p_{tea}$ is "sharpened" to $\hat{p}_{tea}$, and the sample is pushed away from the decision boundary to generate better targets for consistency alignment. With the two predictions of differently augmented inputs, the mean-square-error loss is adopted as the local objective for the unlabeled local clients as defined by Equation (3):

$$\mathcal{L}_{MSE} = \|\hat{p}_{tea} - p_{stu}\|_2^2. \quad (3)$$

It is noted that only the student model is updated by Equation (3), and the teacher model receives student model parameters by exponential moving average after each local iteration as defined by Equation (4):

$$\theta_{tea} = \alpha \theta_{stu} + (1-\alpha) \theta_{tea}, \quad (4)$$

where $\alpha$ is the momentum parameter. The unlabeled local client finally returns the student model as its local model $\theta_u$.

1.3. Random Sampling Consensus FL

The RSCFed method of the subject invention is a FSSL framework with random subset sampling and distance-reweight model aggregation, configured to obtain a more robust global model from heavily biased local models. In particular, all clients are randomly subsampled and models they uploaded are collected to dig their underlying consensus. Then, a subconsensus model is obtained by aggregating collected models, where a distance-reweighted model aggregation (DMA) strategy is introduced to dynamically adjust their weights. These two steps are repeated for M times to obtain a set of sub-consensus models. Then, the sub-consensus models set is aggregated to obtain a global model in each round.

Multiple Random Sub-Samplings

Random sub-sampling is utilized to distill a sub-consensus model and multiple random sub-samplings are performed to get multiple sub-consensus models. To achieve this goal, at the beginning of the synchronization round t, independent random subsampling is performed M times to sample K clients. Then, the global model $\theta_{glob}^{t}$ is sent by the server to the sampled local clients, followed by executing local training on the sampled local clients. It is noted that if the local clients are sampled multiple times in a round, the global model is not required to be sent to the local client for initialization again in order to minimize the communication costs between the server and the local clients.

Distance-Reweighted Model Aggregation

To enhance the robustness of the sub-consensus model, instead of aggregating multiple selected clients as shown in the conventional FedAvg method [23], a distance-reweighted model aggregation (DMA) is employed to dynamically increase the weights for models that are close to the average model and vice versa. For local models of the sampled local clients, the model aggregation is performed with a model distance-based re-weighting strategy. For each subset, an intra-subset averaged model $\theta_{avg}$ is first computed as defined by Equation (5):

$$N_{total} = \sum_{i=1}^{K} N_i, \text{ and } \theta_{avg} = \sum_{i=1}^{K} \frac{N_i}{N_{total}} \theta_i, \quad (5)$$

where $\theta_i$ represents the $i^{th}$ local model of the subset, $N_i$ stands for its local data amount, and K denotes the number of clients in a subset. Instead of simply averaging local clients, the DMA dynamically scales weight $w_i$ for $i^{th}$ client in each subset, as defined by Equation (6):

$$w_i = \frac{N_i}{N_{total}} \exp\left(-\beta \cdot \frac{\|\theta_i - \theta_{avg}\|_2}{N_i}\right), \text{ and } \overline{w}_i = \frac{w_i}{\sum_j w_j}, \quad (6)$$

where $\beta$ is a hyper-parameter and $\|\theta_i - \theta_{avg}\|_2$ refers to $L_2$ Norm of the model gradient between $i^{th}$ local model and temporal averaged model within the subset. The model distance is divided by local data quantity $n_i$ to reduce the impact of local iterations on model drift. Then, the intra-subset model weight is normalized to be in a range of [0, 1]. After obtaining a set of sub-consensus models, their equally weighted averages are denoted to be the final global model $\theta_{glob}$ by Equation (7):

$$\theta_{glob}^{t+1} = \frac{1}{M} \sum_{m=0}^{M-1} \theta_{sub}^{m}, \quad (7)$$

where $\theta_{sub}^{m}$ denotes the $m^{th}$ sub-consensus model. Then $t+1^{th}$ synchronization round is executed with $\theta_{glob}^{t+1}$ as initialization. The whole updating process in the $t^{th}$ synchronization round of the RSCFed method is illustrated in the Algorithm 1 below.

| Algorithm 1: The RSCFed framework |
|---|

```
Input: θ_glob^t:       the global model from t - 1^th round;
                       N: number of clients; M: number of subsets:
                       K: number of clients in each subset
Output: θ_glob^{t+1} from the t^th round
1  for m ← 0 to M do
2  |       Randomly select {C_i}_{i=1}^K from N clients
   |       for k ← 0 to K do
3  |       |       send global model θ_glob to C_k;
4  |       |_      θk ← LocalTraining(k, θ_glob)
5  |       θ̄ ← Avg(θ_k, k = 0toK - 1) Eqn. (5);
6  |       w̄_k ← ReWeight(θ_k^m, θ̄^m) Eqn. (6);
7  |              K-1
   |       θ_sub^m ← Σ w̄_k θ_k^m
   |              k=0
   |_
8            1  M-1
   Return θ_glob^{t+1} ← ─  Σ  θ_sub^m
             M m=0
```

2. Experiments

To demonstrate the effectiveness and robustness of the embodiments of the RSCFed method of the subject invention, experiments are conducted on a plurality of benchmark datasets such that the embodiments of the RSCFed method with various settings such as different unlabeled data ratio or limited communication cost can be evaluated.

2.1. Dataset and Experimental Setup

Benchmark Datasets

The effectiveness of the embodiments of the RSCFed method of the subject invention is evaluated based on two natural image classification datasets, namely, SVHN and CIFAR-100. Moreover, to simulate the realistic privacy data decentralized-distributed scenario, the RSCFed method is also evaluated based on ISIC 2018 (Skin Lesion Analysis Towards Melanoma Detection) dataset including 10,015 dermoscopy images with seven types of skin lesions. For all three benchmark datasets, 80% images of each dataset are randomly selected for training, and the remaining images are reserved for testing. For the SVNH and CIFAR-100 datasets, the original 32×32 images are resized to be 40×40 pixels, randomly cropped to have a 32×32 region, and then a normalization operation is performed on the cropped region to generate the input for the network of the RSCFed method. With respect to the ISIC 2018 dataset, the spatial resolution of the original image is resized from 600×450 pixels to 240×240 pixels, then a region of 224×224 pixels is randomly cropped, and the cropped region is normalized to be input to the network of the RSCFed method.

Feature Extraction Backbone

When training the SVHN and CIFAR-100 datasets, a suitable network such as a CNN network, which contains two 5×5 convolution layers, a 2×2 max-pooling layer, and two fully-connected layers, can be employed as the feature extraction backbone. For the ISIC 2018 dataset, ResNet-18 is utilized as the feature extraction backbone. Further, a two-layer MLP and a fully-connected layer can be used to formulate a classification network at each client for all datasets. The same classification network is also used at each client by the conventional FL methods for the purpose of comparison with the RSCFed method of the subject invention.

Federated Learning Setting

To simulate the federated learning setting, the number of clients is empirically set to be 10, and the conventional methods of [16, 26, 33] are used to have a Dirichlet distribution Dir($\gamma$) ($\gamma$=0.8 for all three benchmark datasets) to generate the non-IID data partition in clients. After adopting such a Non-IID data partition strategy, the number of classes and samples at each client differ from each other, and thus not all clients contain samples from all classes. The one with about 10% samples of total data and all classes is chosen as the labeled local client of the federated semi-supervised learning (FSSL) method. In summary, the training dataset of the FSSL setting contains ten clients: one labeled client with approximately 10% sample data with the classification labels, and nine unlabeled clients with only unlabeled samples. The same FSSL training dataset is used to train the network of the conventional FL methods for the purpose of comparison with the RSCFed method of the subject invention.

Implementation Details

Figure 3:
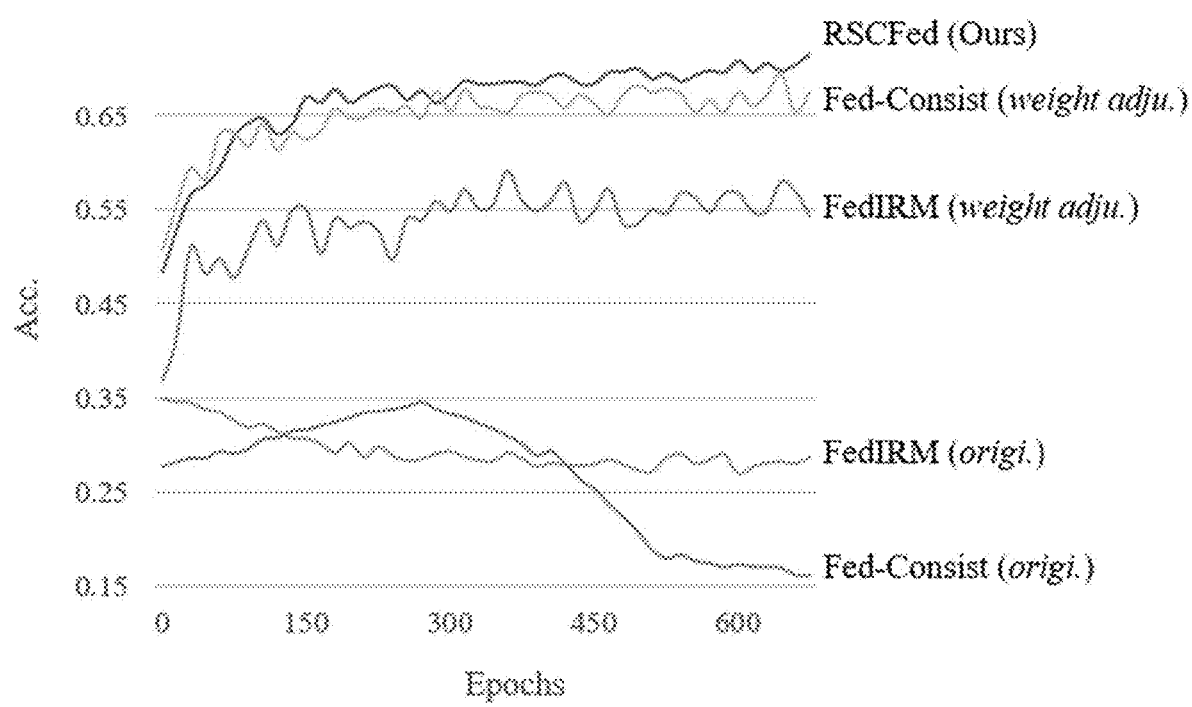
FIG. 3 is a plot diagram showing experiment results to compare accuracy of the RSCFed method with accuracies of the conventional FedIRM method and Fed-Consist method under original setting (origi.) and under weight adjusting setting (weight adju.), according to an embodiment of the subject invention.

It is noted that the original work in [21, 28] generated very limited number of results with enough labeled data when all local models are aggregated by the conventional FedAvg method [23] as shown in FIG. 3. Hence, the method of is re-implemented to increase aggregation weight for labeled local client from the set {20%; 30%; 50%; and 70%}. The results of the experiments show that the 50% set achieves the best classification accuracy. Hence, the weight of labeled client is empirically enlarged to be about 50%, and other nine unlabeled clients share the remaining 50% weight in each FSSL synchronization round. Such aggregating weight is also applied to guarantee the deep model performance when the convention FedIRM method and the RSCFed method of the subject invention are re-implemented. In the RSCFed method, the number of sub-sampling operations M and the number of local clients used in each sub-sampling operation K are set as: M=3, and K=5.

The SGD optimizer is utilized and the RSCFed method is implemented with PyTorch. The learning rates in the labeled local client and the unlabeled local clients are empirically set to be 0.03 and 0.021 for all methods performed on the SVHN and CIFAR-100 datasets, and 0.002 and 0.001 for the ISIC 2018 dataset. The batch size is set to be 64 for the SVHN and CIFAR-100 datasets, and 12 for the ISIC 2018 dataset. About 1000 synchronization rounds are trained for all datasets to make the global model stably converged, and the local training epoch is set to be 1. The RSCFed method of the subject invention has three parameters: the momentum parameter a of Equation (4), temperature parameter $\tau$ of Equation (2), and the scaling factor $\beta$ of Equation (6). An empirically setting of $\alpha$=0.001, $\tau$=0.5 is used for all three benchmark datasets. The scaling factor $\beta$ is set to be 10,000 for the SVHN and CIFAR-100 datasets, and 0.05 for the ISIC 2018 dataset.

2.2 Comparisons of the RSCFed Method with the Conventional Methods

The RSCFed method of the subject invention is compared against the conventional FSSL methods including (1) FedIRM [21], which computes an inter-class relationship labeled clients and utilizes it as extra supervisions for the unlabeled clients; and (2) Fed-Consist [28], which computes a consistency loss on predictions from multiple augmented inputs for the unlabeled data in a mean teacher framework [25]. The RSCFed network of the subject invention is also compared against the conventional FedAvg method trained with all 10 labeled clients as the upper-bound classification result, and the conventional FedAvg trained with one labeled client as the lower bound classification result. The results of the comparisons are summarized in Table 1. Moreover, four widely-used metrics including Accuracy, Area under the ROC Curve (AUC), Precision, and Recall, are employed to evaluate these different methods.

In particular, Table 1 shows results based on the SVHN, CIFAR-100, and ISIC 2018 datasets under heterogeneous data partition. It is noted that the conventional FedIRM method and Fed-Consist method fail to generalize in the Non-IID setting. The results presented in Table 1 are performed with weight adjusting as shown in FIG. 3.

Evaluation Based on the CIFAR-100 Dataset

With respect to the CIFAR-100 database, the FedIRM method achieves an Accuracy score of 14.11%, an AUC score of 79.22%, and a Recall score of 14.03%, while the Fed-Consist method achieves a Precision score of 15.12%. In comparison, the RSCFed method of the subject invention

TABLE 1

| Labeling Strategy | Method | Client Num. | | Metrics | | | |
|---|---|---|---|---|---|---|---|
| | | labeled | unlabeled | Acc. (%) | AUC. (%) | Precision (%) | Recall (%) |
| | | Dataset 1: SVHN | | | | | |
| Fully supervised | FedAvg [23] (upper-bound) | 10 | 0 | 82.05 | 97.82 | 81.59 | 77.90 |
| | FedAvg [23] (lower-bound) | 1 | 0 | 60.54 | 91.23 | 64.38 | 57.34 |
| Semi supervised | FedIRM [21] | 1 | 9 | 55.69 | 91.19 | 66.78 | 56.40 |
| | Fed-Consist [28] | 1 | 9 | 66.94 | 94.19 | 68.92 | 66.75 |
| | RSCFed (ours) | 1 | 9 | 70.26 | 95.54 | 73.36 | 68.46 |
| | | Dataset 2: CIFAR-100 | | | | | |
| Fully supervised | FedAvg [23] (upper-bound) | 10 | 0 | 25.87 | 90.44 | 29.97 | 26.01 |
| | FedAvg [23] (lower-bound) | 1 | 0 | 12.02 | 76.03 | 10.76 | 11.58 |
| Semi supervised | FedIRM [21] | 1 | 9 | 14.11 | 79.22 | 14.64 | 14.03 |
| | Fed-Consist [28] | 1 | 9 | 13.89 | 78.31 | 15.12 | 12.95 |
| | RSCFed (ours) | 1 | 9 | 15.82 | 81.41 | 15.85 | 16.37 |
| | | Dataset 3: ISIC 2018: Skin Lesion Classification | | | | | |
| Fully supervised | FedAvg [23] (upper-bound) | 10 | 0 | 84.07 | 95.64 | 76.68 | 62.97 |
| | FedAvg [23] (lower-bound) | 1 | 0 | 68.14 | 84.12 | 41.91 | 38.61 |
| Semi supervised | FedIRM [21] | 1 | 9 | 68.10 | 84.11 | 41.96 | 38.94 |
| | Fed-Consist [28] | 1 | 9 | 68.32 | 84.61 | 41.91 | 38.63 |
| | RSCFed (ours) | 1 | 9 | 70.26 | 86.01 | 45.65 | 37.91 |

Quantitative Comparisons

Table 1 presents the quantitative results of the RSCFed method of the subject invention and the conventional methods performed on three benchmark datasets and evaluated in terms of four metrics. It is observed that the results of the two conventional FSSL methods, namely, the FedIRM method and the Fed-Consist method and the RSCFed method of the subject invention are between the upper-bound and the lower-bound obtained by the FedAvg method [23] for all three benchmark datasets. Further, it is observed that the RSCFed method of the subject invention demonstrates superior metric performance over the two conventional method across all three benchmark datasets. The superior performance of the RSCFed method of the subject invention over the conventional Fed-Consist method indicates a generalization ability enhancement obtained by the aggregation strategy in the RSCFed method of the subject invention. Moreover, the RSCFed method of the subject invention also outperforms the FedIRM method in terms of four metrics across all three datasets thanks to the consistent assumption that inter-class relationship among clients is not applicable due to non-IID data distribution on all clients.

Evaluation Based on the SVHN Dataset

With respect to the two conventional methods, the Fed-Consist method achieves an Accuracy performance of 66.94%, an AUC performance of 94.19%, a Precision performance of 68.92%, and a Recall performance of 66.75%. In comparison, the RSCFed method of the subject invention achieves an Accuracy of 70.29% (3.32% improvement over the Fed-Consist method), an AUC of 95.54% (1.35% improvement over the Fed-Consist method), a Precision of 73.36% (4.44% improvement over the Fed-Consist method), and a Recall of 68.46% (1.71% improvement over the Fed-Consist method).

achieves an Accuracy score of 15.82%, an AUC score of 81.41%, a Precision score of 15.85%, and a Recall score of 16.37%.

Evaluation Based on the ISIC 2018 Dataset

Although the conventional Fed-Consist method achieves a Recall score better than that of the RSCFed method of the subject invention, the RSCFed method achieves an Accuracy score of 70.26%, an AUC score of 86.01%, and a Precision score of 45.65%, indicating that the RSCFed method of the subject invention achieves a classification accuracy higher than the conventional FL methods when performed on the ISIC 2018 dataset.

2.3. Ablation Studies

Ablative experiments are conducted to evaluate the effectiveness of the major components (sub-sampling and aggregation strategy) of the RSCFed method of the subject invention. The performance of the RSCFed method of the subject invention is analyzed in terms of parameters including unlabeled ratio, communication cost limitations, and hyper-parameters. All experimental results are evaluated based on experiments performed on the SVHN dataset unless separately clarified.

Effectiveness of SSO and DMA

To evaluate the effectiveness of the multiple sub-sampling operations (SSO) and the distance-reweighted model aggregation (DMA), an ablation study is performed on the three benchmark datasets. Table 2 summarizes comparisons of the Accuracy and AUC scores of quantitative results of the RSCFed method of the subject invention and the two conventional baseline networks, namely, "Basic+SSO" and "Basic".

In particular, Table 2 presents quantitative results of the RSCFed method of the subject invention and the conventional backbone models without the multiple sub-sampling operations and the distance-reweighted aggregation mechanism on the three benchmark datasets. "SSO" denotes the multiple sub-sampling operation with model aggregation, while "DMA" represents the distance-reweighted model aggregation mechanism.

TABLE 2

|  | SSO | DMA | Acc. (%) | AUC (%) |
|---|---|---|---|---|
| Dataset 1: SVHN | | | | |
| Basic | X | X | 66.94 | 94.19 |
| Basic + SSO | ✓ | X | 69.15 | 95.2 |
| RSCFed (ours) | ✓ | ✓ | 70.26 | 95.54 |
| Dataset 2: CIFAR-100 | | | | |
| Basic | X | X | 13.89 | 78.3 |
| Basic + SSO | ✓ | X | 14.92 | 81.8 |
| RSCFed (ours) | ✓ | ✓ | 15.82 | 81.4 |
| Dataset 3: ISIC 2018 | | | | |
| Basic | X | X | 68.74 | 84.7 |
| Basic + SSO | ✓ | X | 69.85 | 85.5 |
| RSCFed (ours) | ✓ | ✓ | 70.26 | 86.0 |

From the quantitative results, it is determined that the SSO and the DMA make significant contributions to the success of the RSCFed method of the subject invention in the FSSL scenario. Based on the quantitative results of "Basic+SSO" and "Basic", it is determined that the SSO increases the accuracy score by 2.21% and the AUC score by 1.01% when performed on the SVHN dataset, the accuracy score by 1.03% and the AUC score by 3.5% when performed on the CIFAR-100 dataset, and the accuracy score by 1.11% and the AUC score by 0.8% when performed on the ISIC 2018 dataset. Moreover, the DMA of the RSCFed method of the subject invention is determined to improve the accuracy score by 1.11% and the AUC score by 0.34% when performed on the SVHN dataset, the accuracy score by 0.9% and the AUC score by −0.4% when performed on the CIFAR-100 dataset, and the accuracy score by 0.41% and the AUC score by 0.5% when performed on the ISIC 2018 dataset.

Unlabeled Client Ratio

It is noted that the conventional FedIRM method utilizes ten clients having one labeled client and nine unlabeled clients as the setting of the FSSL. The RSCFed method of the subject invention empirically divides the whole training data into ten clients including one labeled client, or 10% labeled clients, and nine unlabeled clients, or 90% unlabeled clients. To evaluate the performance of the RSCFed method of the subject invention under different unlabeled client ratios, an ablation study is conducted in order to compare different federated semi-supervised learning methods in terms of different numbers of clients, where the number of labeled clients is empirically set to be 1 for all the methods. Herein, the whole client numbers are set to be 5, 10, 15, 25, 35, and 50 in various experiments and Table 3 presents the experiment results of the RSCFed method of the subject invention and the conventional Fed-Consist method [28]. As shown in the table, the improvements made by the RSCFed method of subject invention over the conventional Fed-Consist method in term of Accuracy and AUC scores are enhanced when the number of unlabeled clients increases. The accuracy improvement is progressively increased from 1.51% to 3.98%, and the AUC improvement is from 0.5% to 3.5%, as the number of unlabeled clients grows from 4 to 49.

In particular, Table 3 shows the results of the ablation study of the RSCFed method of the subject invention in comparison with the results of the Fed-Consist method [28], which is a SOTA FSSL method, in terms of different unlabeled client numbers.

TABLE 3

| Total client numbers | Client splitting | | Fed-Consist [28] | | Our RSCFed | | Improvements | |
|---|---|---|---|---|---|---|---|---|
| | Labeled | Unlabeled | Acc.(%) | AUC.(%) | Acc.(%) | AUC.(%) | Acc.(%) | AUC.(%) |
| 5 | 1 | 4 | 67.82 | 95.3 | 69.33 | 95.8 | 1.51 | 0.5 |
| 10 | 1 | 9 | 66.94 | 94.2 | 70.26 | 95.5 | 3.32 | 1.3 |
| 15 | 1 | 14 | 69.65 | 94.3 | 73.19 | 95.6 | 3.54 | 1.3 |
| 25 | 1 | 24 | 60.28 | 89.3 | 63.79 | 90.9 | 3.51 | 1.6 |
| 35 | 1 | 34 | 56.08 | 90.6 | 59.82 | 92.8 | 3.74 | 2.2 |
| 50 | 1 | 49 | 56.20 | 88.0 | 60.18 | 91.5 | 3.98 | 3.5 |

Communication Cost Limitations

It is noted that the two conventional methods for comparison with the RSCFed method of the subject invention passed ten local client models in each synchronization round, while the RSCFed method of the subject invention considers 15 local models, since 3 sub-sampling operations are utilized and 5 local clients are selected in each sub-sampling operation. Hence, the communication cost of the RSCFed method of the subject invention is 1.5 times that of the convention Fed-Consist method [28]. An ablation study experiment is conducted to evaluate the RSCFed method of the subject invention under different communication cost limitations. Specifically, three more cases with 8 clients, 9 clients, and 10 clients are considered. Accordingly, the communication costs are 0.8, 0.9, and 1.0 times of the Baseline's communication cost. Table 4 presents the Accuracy and AUC scores of the RSCFed method of the subject invention and the conventional Fed-Consist method with different communication costs. The results show that the RSCFed method of the subject invention with 0.8 times of communication cost outperforms the conventional Fed-Consist method in terms of Accuracy and AUC scores.

In particular, Table 4 summarizes the results of the ablation study of the RSCFed method of the subject invention in comparisons with the results of the conventional Fed-Consist method in terms of different communication costs. In Table 4, "Com. cost" stands for communication cost and denotes how many times as much as that of the conventional Fed-Consist method [28].

TABLE 4

| Method | Client num. | Com. cost | Metrics | |
| --- | --- | --- | --- | --- |
| | | | Acc. (%) | AUC (%) |
| Fed-Consist [28] | 10 | 1.0x | 66.94 | 94.2 |
| Our RSCFed | 8 | 0.8x | 68.23 | 94.4 |
| | 9 | 0.9x | 69.25 | 95.0 |
| | 10 | 1.0x | 69.54 | 95.2 |
| | 15 | 1.5x | 70.26 | 95.5 |

Hyper-Parameters

The RSCFed method of the subject invention has two major hyper-parameters, namely, the number (M) of sub-sampling operations and the number (K) of local clients that are used in each sub-sampling operation. The RSCFed method of the subject invention empirically sets M=3, and K=5. Herein, an ablation study is conducted to study the effects of different choices of M and K and the Accuracy and AUC scores are summarized in Table 5. Based on the results, it is determined that the Accuracy and AUC scores are only slightly different under different M and K values.

In particular, Table 5 presents results of the ablation study in terms of different hyperparameter values. Herein, M denotes the number of sub-sampling and K represents the number of clients in each sub-sampling.

TABLE 5

| Hyper-parameters | Metrics | |
| --- | --- | --- |
| M × K | Acc. (%) | AUC (%) |
| 3 × 5 | 70.26 | 95.5 |
| 5 × 3 | 70.28 | 95.1 |
| 2 × 7 | 70.13 | 95.4 |
| 4 × 4 | 70.18 | 95.2 |

Figure 4:
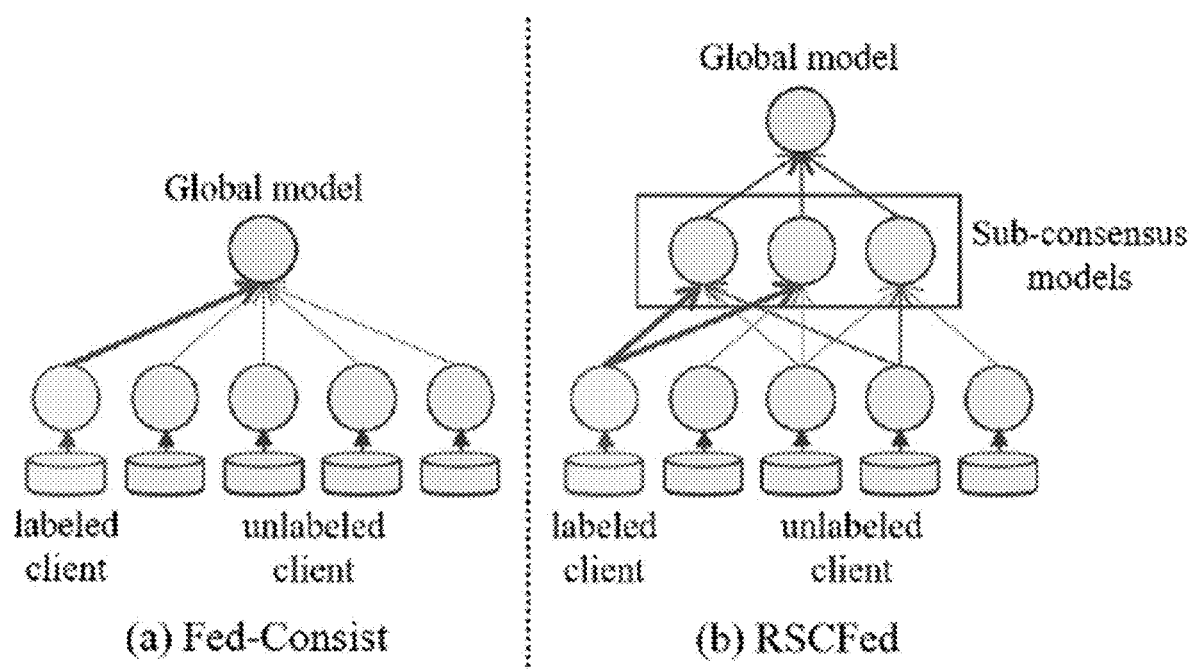
FIG. 4 is a schematic representation of the RSCFed method of the subject invention in comparison with the conventional Fed-Consist method, wherein the RSCFed method distills multiple sub-consensus models from local models and updates the global model by aggregating sub-consensus models according to an embodiment of the subject invention, while the conventional Fed-Consist method performs standard model aggregation according to the FedAvg methodology.

According to embodiments of subject invention, a random sampling consensus federated (RSCFed) learning method and systems are configured to consider uneven reliability between models from labeled clients and unlabeled clients under the Non-IID setting without any information leakage among clients. In the FSSL setting, the labeled local clients are easily biased towards local data, while it is difficult for the unlabeled local clients to achieve high accuracy, leading to the uneven model reliability among local clients. To achieve a robust global model, the local models are regarded as noisy models and several consensus models are distilled by random sampling before aggregating to the global model, as shown in FIG. 4. Specifically, in each synchronization round, clients are randomly sub-sampled and the averaged weights are recorded from the sub-sampled models as a sub-consensus model. By performing the operation multiple times, the global model is updated by aggregating multiple sub-consensus models. To distill a robust sub-consensus model from the randomly sampled local clients, the distance-reweighted model aggregation (DMA) module is used, which dynamically increases the weights for models that are close to the sub-consensus model and vice versa. Extensive experiments are conducted on natural image classification datasets (for example, SVHN and CIFAR-100) and medical dataset (for example, ISIC 2018 Skin) and the effectiveness of the RSCFed method of the subject invention is demonstrated.

In comparison with the conventional Federated Learning methods with NonIID, the RSCFed method of the subject invention offers a number of advantages:

1. RSCFed method addresses the issue of uneven reliability of Non-IID local clients and focuses on solving the data heterogeneity problem under the FSSL scheme;
2. unlike the conventional FSSL frameworks that directly aggregate the local clients, the RSCFed method is configured to update the global model by aggregating multiple sub-consensus models;
3. to improve the sub-consensus model, the distance-reweighted model aggregation (DMA) module, which dynamically adjusts the weights of each sampled local client to the sub-consensus model, is employed.
4. experiments performed on three public datasets demonstrate that the RSCFed method significantly outperforms the conventional FSSL methods, and the larger the ratio of unlabeled data is, the greater improvement the RSCFed can achieve.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

[1] David Berthelot, Nicholas Carlini, Ian Goodfellow, Nicolas Papernot, Avital Oliver, and Colin Raffel. Mixmatch: A holistic approach to semi-supervised learning. arXiv preprint arXiv:1905.02249, 2019. 3, 4
[2] Hong-You Chen and Wei-Lun Chao. Fedbe: Making bayesian model ensemble applicable to federated learning. In International Conference on Learning Representations, 2021. 3
[3] Xiaokang Chen, Yuhui Yuan, Gang Zeng, and Jingdong Wang. Semi-supervised semantic segmentation with cross pseudo supervision. In Proceedings of the IEEE/CVF Conference on Computer Vision and Pattern Recognition, pages 2613-2622, 2021. 3
[4] Wenhui Cui, Yanlin Liu, Yuxing Li, Menghao Guo, Yiming Li, Xiuli Li, Tianle Wang, Xiangzhu Zeng, and Chuyang Ye. Semi-supervised brain lesion segmentation with an adapted mean teacher model. In International Conference on Information Processing in Medical Imaging, pages 554-565. Springer, 2019. 3
[5] Martin A Fischler and Robert C Bolles. Random sample consensus: a paradigm for model fitting with applications to image analysis and automated cartography. Communications of the ACM, 24(6):381-395, 1981. 2
[6] Kaiming He, Xiangyu Zhang, Shaoqing Ren, and Jian Sun. Deep residual learning for image recognition. In Proceedings of the IEEE conference on computer vision and pattern recognition, pages 770-778, 2016. 5
[7] Zijian Hu, Zhengyu Yang, Xuefeng Hu, and Ram Nevatia. Simple: Similar pseudo label exploitation for semi-supervised classification. In Proceedings of the IEEE/

[8] Wonyong Jeong, Jaehong Yoon, Eunho Yang, and Sung Ju Hwang. Federated semi-supervised learning with inter-client consistency & disjoint learning. In International Conference on Learning Representations, 2021. 1, 3

[9] Peter Kairouz, H Brendan McMahan, Brendan Avent, Aur'elien Bellet, Mehdi Bennis, Arjun Nitin Bhagoji, Kallista Bonawitz, Zachary Charles, Graham Cormode, Rachel Cummings, et al. Advances and open problems in federated learning. arXiv preprint arXiv:1912.04977, 2019. 1

[10] Georgios A Kaissis, Marcus R Makowski, Daniel R"uckert, and Rickmer F Braren. Secure, privacy-preserving and federated machine learning in medical imaging. Nature Machine Intelligence, 2(6):305-311, 2020. 1

[11] Yan Kang, Yang Liu, and Tianjian Chen. Fedmvt: Semi-supervised vertical federated learning with Multiview training. arXiv preprint arXiv:2008.10838, 2020. 3

[12] Sai Praneeth Karimireddy, Satyen Kale, Mehryar Mohri, Sashank Reddi, Sebastian Stich, and Ananda Theertha Suresh. Scaffold: Stochastic controlled averaging for federated learning. In International Conference on Machine Learning, pages 5132-5143. PMLR, 2020. 1, 2

[13] Jakub Konevcn'y, H Brendan McMahan, Felix X Yu, Peter Richt'arik, Ananda Theertha Suresh, and Dave Bacon. Federated learning: Strategies for improving communication efficiency. arXiv preprint arXiv:1610.05492, 2016. 2

[14] Rajesh Kumar, Abdullah Aman Khan, Jay Kumar, A Zakria, Noorbakhsh Amiri Golilarz, Simin Zhang, Yang Ting, Chengyu Zheng, and WenYong Wang. Blockchain-federated-learning and deep learning models for covid-19 detection using ct imaging. IEEE Sensors Journal, 2021. 1

[15] Qinbin Li, Yiqun Diao, Quan Chen, and Bingsheng He. Federated learning on non-iid data silos: An experimental study. arXiv preprint arXiv:2102.02079, 2021. 1 [16] Qinbin Li, Bingsheng He, and Dawn Song. Modelcontrastive federated learning. In Proceedings of the IEEE/CVF Conference on Computer Vision and Pattern Recognition, pages 10713-10722, 2021. 1, 2, 5

[17] Tian Li, Anit Kumar Sahu, Manzil Zaheer, Maziar Sanjabi, Ameet Talwalkar, and Virginia Smith. Federated optimization in heterogeneous networks. arXiv preprint arXiv:1812.06127, 2018. 2

[18] Xiaomeng Li, Lequan Yu, Hao Chen, Chi-Wing Fu, Lei Xing, and Pheng-Ann Heng. Transformation consistent self-ensembling model for semisupervised medical image segmentation. IEEE Transactions on Neural Networks and Learning Systems, 32(2):523-534, 2020. 3

[19] Haowen Lin, Jian Lou, Li Xiong, and Cyrus Shahabi. Semifed: Semi-supervised federated learning with consistency and pseudo-labeling. arXiv preprint arXiv: 2108.09412, 2021. 1, 3

[20] Quande Liu, Cheng Chen, Jing Qin, Qi Dou, and Pheng-Ann Ileng. Feddg: Federated domain generalization on medical image segmentation via episodic learning in continuous frequency space. In Proceedings of the IEEE/CVF Conference on Computer Vision and Pattern Recognition, pages 1013-1023, 2021. 2

[21] Quande Liu, Hongzheng Yang, Qi Dou, and Pheng-Ann Heng. Federated semi-supervised medical image classification via inter-client relation matching. arXiv preprint arXiv:2106.08600, 2021. 1, 2, 3, 6, 7

[22] Yang Liu, Anbu Huang, Yun Luo, He Huang, Youzhi Liu, Yuanyuan Chen, Lican Feng, Tianjian Chen, Han Yu, and Qiang Yang. Fedvision: An online visual object detection platform powered by federated learning. In Proceedings of the AAAI Conference on Artificial Intelligence, volume 34, pages 13172-13179, 2020. 1

[23] Brendan McMahan, Eider Moore, Daniel Ramage, Seth Hampson, and Blaise Aguera y Arcas. Communication-efficient learning of deep networks from decentralized data. In Artificial Intelligence and Statistics, pages 1273-1282. PMLR, 2017. 1, 2, 5, 6

[24] Kihyuk Sohn, David Berthelot, Chun-Liang Li, Zizhao Zhang, Nicholas Carlini, Ekin D Cubuk, Alex Kurakin, Han Zhang, and Colin Raffel. Fixmatch: Simplifying semi-supervised learning with consistency and confidence. arXiv preprint arXiv:2001.07685, 2020. 3

[25] Antti Tarvainen and Harri Valpola. Mean teachers are better role models: Weight-averaged consistency targets improve semi-supervised deep learning results. arXiv preprint arXiv:1703.01780, 2017. 3, 6

[26] Hongyi Wang, Mikhail Yurochkin, Yuekai Sun, Dimitris Papailiopoulos, and Yasaman Khazaeni. Federated learning with matched averaging. In International Conference on Learning Representations, 2020. 3, 5

[27] Jianyu Wang, Qinghua Liu, Hao Liang, Gauri Joshi, and H Vincent Poor. Tackling the objective inconsistency problem in heterogeneous federated optimization. arXiv preprint arXiv:2007.07481, 2020. 3

[28] Dong Yang, Ziyue Xu, Wenqi Li, Andriy Myronenko, Holger R Roth, Stephanie Harmon, Sheng Xu, Bans Turkbey, Evrim Turkbey, Xiaosong Wang, et al. Federated semi-supervised learning for covid region segmentation in chest ct using multi-national data from china, italy, japan. Medical image analysis, 70:101992, 2021. 1, 2, 3, 6, 7, 8

[29] Qiang Yang, Yang Liu, Tianjian Chen, and Yongxin Tong. Federated machine learning: Concept and applications. ACM Transactions on Intelligent Systems and Technology (TIST), 10(2):1-19, 2019. 2

[30] Hongxu Yin, Arun Mallya, Arash Vahdat, Jose M Alvarez, Jan Kautz, and Pavlo Molchanov. See through gradients: Image batch recovery via gradinversion. In Proceedings of the IEEE/CVF Conference on Computer Vision and Pattern Recognition, pages 16337-16346, 2021. 8

[31] Tehrim Yoon, Sumin Shin, Sung Ju Hwang, and Eunho Yang. Fedmix: Approximation of mixup under mean augmented federated learning. In International Conference on Learning Representations, 2021. 2

[32] Lequan Yu, Shujun Wang, Xiaomeng Li, Chi-Wing Fu, and Pheng-Ann Heng. Uncertainty-aware selfensembling model for semi-supervised 3d left atrium segmentation. In International Conference on Medical Image Computing and Computer-Assisted Intervention, pages 605-613. Springer, 2019. 3

[33] Mikhail Yurochkin, Mayank Agarwal, Soumya Ghosh, Kristjan Greenewald, Nghia Hoang, and Yasaman Khazaeni. Bayesian nonparametric federated learning of neural networks. In International Conference on Machine Learning, pages 7252-7261. PMLR, 2019. 5

[34] Michael Zhang, Karan Sapra, Sanja Fidler, Serena Yeung, and Jose M. Alvarez. Personalized federated learning with first order model optimization. In International Conference on Learning Representations, 2021. 3

[35] Zhengming Zhang, Zhewei Yao, Yaoqing Yang, Yujun Yan, Joseph E Gonzalez, and Michael W Mahoney.

Benchmarking semi-supervised federated learning. arXiv preprint arXiv:2008.11364, 17, 2020. 3

[36] Yuliang Zou, Zizhao Zhang, Han Zhang, Chun-Liang Li, Xiao Bian, Jia-Bin Huang, and Tomas Pfister. Pseudoseg: Designing pseudo labels for semantic segmentation. arXiv preprint arXiv:2010.09713, 2020. 3

I claim:

1. A method of random sampling consensus federated (RSCFed) learning, comprising:
randomly sampling local clients;
assigning a current global model to the randomly sampled local clients for initialization at beginning of a synchronization round;
conducting local training on the randomly sampled local clients;
collecting local models from the randomly sampled local clients and executing distance-reweighted model aggregation (DMA) on the collected local models to obtain a sub-consensus model;
repeating the foregoing steps multiple times to obtain a set of sub-consensus models; and
aggregating a new model based on the sub-consensus models to be a next global model.

2. The method of claim 1, wherein the local clients comprise labeled local clients having labeled local data and unlabeled local clients having unlabeled local data.

3. The method of claim 1, wherein the step of assigning a current global model to the randomly sampled clients for initialization comprises initializing the local models with the current global model for performing local training on the randomly sampled clients.

4. The method of claim 2, wherein the step of conducting local training comprises conducting standard supervised and unsupervised training on the labeled and unlabeled local clients, respectively.

5. The method of claim 1, wherein the local training on the labeled local clients is conducted with a main objective, cross-entropy loss, $L_{CE}$, defined by Equation:

$$L_{CE} = -y_i \log(\hat{y}_i);$$

where $\hat{y}_i$ is a prediction of the randomly sampling local clients from a corresponding local model.

6. The method of claim 2, wherein the local training on the unlabeled local clients is conducted by a mean-teacher-based consistency regularization framework and regarding a student model as the local model.

7. The method of claim 1, wherein the distance-reweighted model aggregation (DMA) is configured to dynamically adjust weights of the collected models.

8. The method of claim 2, wherein during the local training on the unlabeled local clients, after predictions from the student model and the teacher model are generated, a sharpening method is configured to increase a temperature of the predictions of the teacher model.

9. The method of claim 8, wherein when the local training is completed, the student model is provided as the local model for a corresponding unlabeled local client.

10. The method of claim 1, wherein the executing distance-reweighted model aggregation (DMA) comprises:
computing an intra-subset averaged model for each subset;
scaling weight for the local client in each subset; and
normalizing the intra-subset model weight into a range of [0, 1].

11. A system for performing random sampling consensus federated (RSCFed) learning, comprising:
a federal server coupled to a plurality of local clients through a communication network;
wherein the federal server is configured to randomly sample the plurality of local clients; assign a current global model to the randomly sampled local clients for initialization at beginning of a synchronization round; conduct local training on the randomly sampled local clients; collect local models from the randomly sampled local clients; execute distance-reweighted model aggregation (DMA) on the collected local models to obtain a sub-consensus model; repeat the foregoing steps multiple times to obtain a set of sub-consensus models; and aggregate a new model based on the sub-consensus models to be a next global model.

12. The system of claim 11, wherein the local clients comprise labeled clients having labeled local data and unlabeled clients having unlabeled local data.

13. The system of claim 11, wherein assigning a current global model to the randomly sampled clients for initialization comprises initializing local models with the current global model for performing local training on the randomly sampled clients.

14. The system of claim 12, wherein the local training comprises conducting standard supervised and unsupervised training on the labeled and unlabeled local clients, respectively.

15. The system of claim 12, wherein the local training on the labeled local clients is conducted with a main objective, cross-entropy loss, LCE, defined by Equation:

$$L_{CE} = -y_i \log(\hat{y}_i);$$

where $\hat{y}_i$ is a prediction of the randomly sampled local clients from a corresponding local model.

16. The system of claim 12, wherein the local training on the unlabeled local clients is conducted by a mean-teacher-based consistency regularization framework and regarding a student model as the local model.

17. The system of claim 11, wherein the distance-reweighted model aggregation (DMA) is configured to dynamically adjust weights of the collected models.

18. The system of claim 12, wherein during the local training on the unlabeled local clients, after predictions from the student model and the teacher model are generated, a sharpening method is configured to increase a temperature of the predictions of the teacher model.

19. The system of claim 18, wherein when the local training is completed, the student model is provided as the local model for a corresponding unlabeled local client.

20. The system of claim 11, wherein the distance-reweighted model aggregation (DMA) is performed by:
computing an intra-subset averaged model for each subset;
scaling weight for a local client in each subset; and
normalizing the intra-subset model weight into a range of [0, 1].

* * * * *